US012641595B2

(12) United States Patent
Islam et al.

(10) Patent No.: US 12,641,595 B2
(45) Date of Patent: May 26, 2026

(54) TECHNIQUES FOR CONFIGURING SOFT RESOURCES IN MULTI-HOP INTEGRATED ACCESS AND BACKHAUL NETWORK

(71) Applicant: QUALCOMM Incorporated, San Diego, CA (US)

(72) Inventors: Muhammad Nazmul Islam, Littleton, MA (US); Navid Abedini, Somerset, NJ (US); Luca Blessent, Whitehouse Station, NJ (US); Jianghong Luo, Skillman, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/595,068

(22) Filed: Oct. 7, 2019

(65) Prior Publication Data

US 2020/0146033 A1 May 7, 2020

Related U.S. Application Data

(60) Provisional application No. 62/755,109, filed on Nov. 2, 2018.

(51) Int. Cl.
*H04W 72/1268* (2023.01)
*H04W 72/0446* (2023.01)
(Continued)

(52) U.S. Cl.
CPC .................. *H04W 72/1268* (2013.01); *H04W 72/0446* (2013.01); *H04W 72/23* (2023.01);
(Continued)

(58) Field of Classification Search
CPC ................ H04L 47/782; H04W 28/16; H04W 72/005; H04W 72/042; H04W 72/0446;
(Continued)

(56) References Cited

U.S. PATENT DOCUMENTS

| | | | |
|---|---|---|---|
| 11,533,749 B2 | 12/2022 | Luo et al. | |
| 2010/0226342 A1* | 9/2010 | Colling | ............... H04W 56/002 |
| | | | 370/336 |

(Continued)

FOREIGN PATENT DOCUMENTS

| | | |
|---|---|---|
| CN | 1949913 A | 4/2007 |
| CN | 102946450 A | 2/2013 |
| WO | 2020223074 A1 | 11/2020 |

OTHER PUBLICATIONS

Final Report of 3GPP TSG RAN WG1 #94bis v1.0.0 (Chengdu, China, Oct. 8-12, 2018) (Year: 2018).*

(Continued)

*Primary Examiner* — Huy D Vu
*Assistant Examiner* — Bao G Nguyen
(74) *Attorney, Agent, or Firm* — QUALCOMM Incorporated

(57) ABSTRACT

In an aspect, methods, apparatuses, and computer-readable mediums for wireless communications in an integrated access and backhaul (IAB) network are disclosed. In an example, the method includes determining a topological state of one or more of a parent node or a child node, determining a scheduling gap value for a set of resources, including a resource for the child node, based on the topological state of one or more of the parent node or the child node, and transmitting a configuration to the parent node for communicating with the child node based at least in part on the scheduling gap value.

28 Claims, 15 Drawing Sheets

(51) Int. Cl.
$$\begin{array}{ll}
\textit{H04W 72/23} & (2023.01) \\
\textit{H04W 72/30} & (2023.01) \\
\textit{H04W 72/50} & (2023.01) \\
\textit{H04W 72/52} & (2023.01)
\end{array}$$

(52) U.S. Cl.
CPC ........... *H04W 72/30* (2023.01); *H04W 72/52* (2023.01); *H04W 72/535* (2023.01)

(58) Field of Classification Search
CPC ......... H04W 72/1252; H04W 72/1257; H04W 72/1268; H04W 88/085

See application file for complete search history.

(56) References Cited

U.S. PATENT DOCUMENTS

| | | | | | |
|---|---|---|---|---|---|
| 2014/0337551 A1* | 11/2014 | Cho | | H04L 12/403 710/110 |
| 2015/0049664 A1* | 2/2015 | Gora | | H04W 84/047 370/315 |
| 2015/0327167 A1* | 11/2015 | Ljung | | H04W 24/02 370/311 |
| 2017/0048783 A1* | 2/2017 | Savolainen | | H04W 76/14 |
| 2018/0146410 A1* | 5/2018 | Cho | | H04W 48/20 |
| 2018/0278402 A1* | 9/2018 | Zeng | | H04L 5/0048 |
| 2018/0323925 A1* | 11/2018 | Huang | | H04L 5/0048 |
| 2019/0349079 A1* | 11/2019 | Novlan | | H04B 7/15542 |
| 2019/0357247 A1* | 11/2019 | Keskitalo | | H04W 72/1284 |
| 2021/0274536 A1* | 9/2021 | Shin | | H04W 72/535 |
| 2021/0400682 A1* | 12/2021 | Liu | | H04L 1/1812 |

OTHER PUBLICATIONS

Final Report of 3GPP TSG RAN WG1 #94bis v1.0.0 (Chengdu, China, Oct. 8-12, 2018) (Year: 2018) (Year: 2018).*

International Search Report and Written Opinion—PCT/US2019/055181—ISA/EPO—Jan. 8, 2020.

Nokia, et al., "Resource Allocation and Coordination for IAB", 3GPP TSG RAN WG2 Meeting #104, 3GPP Draft, R2-1817617_ IAB_Resource Allocation V3, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 1, 2018, XP051481516, 7 pages, Retrieved from the Internet: URL:http://www.3gpp.org/ftp/tsg%5Fran/WG2%5FRL2/TSGR2%5F104/Docs/R2%2D1817617%2Ezip [retrieved on Nov. 1, 2018].

Qualcomm Incorporated: "Resource Management in IAB Network", 3GPP Draft, R1-1813419, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051555458, 8 Pages, Retrieved from the Internet: URL: http://www.3gpp.org/ftp/Meetings%5F3GPP%5FSYNC/RAN1/Docs/R1%2D1813419%2Ezip. [retrieved on Nov. 11, 2018] the whole document.

Qualcomm Incorporated: "IAB Resource Partitioning for Architecture Group 1", 3GPP Draft, R2-1808006 IAB Resource Partitioning for Architecture Group 1, 3rd Generation Partnership Project (3GPP), Mobile Competence Centre, 650, Route Des Lucioles, F-06921 Sophia-Antipolis Cede, vol. RAN WG2, No. Busan, South Korea, May 21, 2018-May 25, 2018, May 11, 2018 (May 11, 2018), XP051465059, 3 Pages, Retrieved from the Internet: URL:http://www.3gpp.org/ftp/tsg%5Fran/WG2%5FRL2/TSGR2%5F102/Docs [retrieved on May 11, 2018], p. 2, figure 2.

Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5.

3GPP: "3rd Generation Partnership Project, Technical Specification Group Radio Access Network, NR, Physical Layer Procedures for Data, (Release 15)", TS 38.214 V15.3.0, Sep. 2018, pp. 1-96, pp. 74-75.

3GPP: "3rd Generation Partnership Project, Technical Specification Group Radio Access Network, NR, Radio Resource Control (RRC) Protocol Specification (Release 15)", TS 38.331 V15.3.0, Sep. 2018, pp. 1-445, p. 249.

* cited by examiner

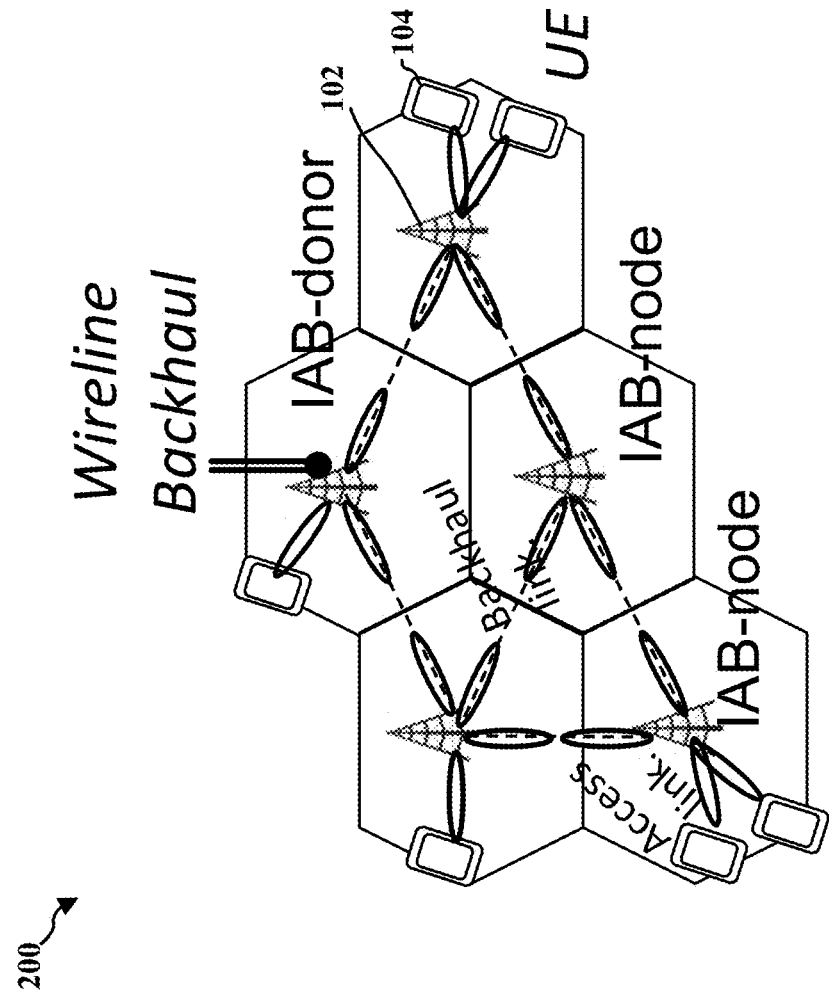
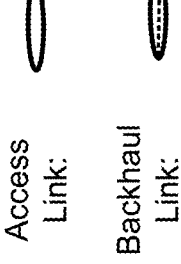
FIG. 2

1100

Determining a topological state of one or more of a parent node or a child node

1102

Determining a scheduling gap value for a set of resources, including a resource for the child node

1104

Transmitting a configuration to the parent node for communicating with the child node based at least in part on the scheduling gap value

1106

1200

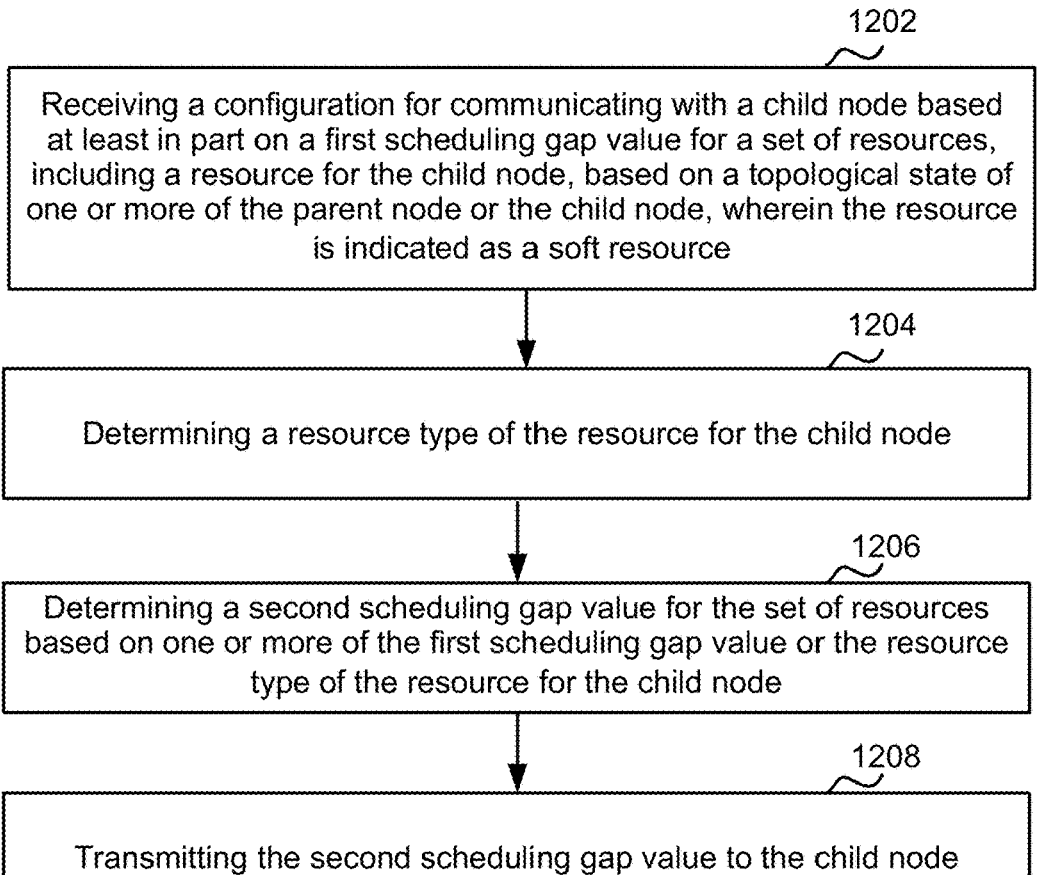

1202

Receiving a configuration for communicating with a child node based at least in part on a first scheduling gap value for a set of resources, including a resource for the child node, based on a topological state of one or more of the parent node or the child node, wherein the resource is indicated as a soft resource

1204

Determining a resource type of the resource for the child node

1206

Determining a second scheduling gap value for the set of resources based on one or more of the first scheduling gap value or the resource type of the resource for the child node

1208

Transmitting the second scheduling gap value to the child node

1302

Transmitting a topological state of the child node to one or more of a parent node or a central entity

1304

Receiving a configuration for communicating with the parent node based at least in part on a scheduling gap value for a set of resources, including a resource for the child node, based on the topological state of the child node, wherein the resource is indicated as a soft resource

FIG. 13

TECHNIQUES FOR CONFIGURING SOFT RESOURCES IN MULTI-HOP INTEGRATED ACCESS AND BACKHAUL NETWORK

CROSS-REFERENCE TO RELATED APPLICATION

This application claims the benefit of U.S. Provisional Application Ser. No. 62/755,109, entitled "HOP DEPENDENT GAP VALUES FOR CONFIGURING SOFT RESOURCES IN MULTI-HOP INTEGRATED ACCESS AND BACKHAUL NETWORK" and filed on Nov. 2, 2018, which is expressly incorporated by reference herein in its entirety.

BACKGROUND

The present disclosure relates generally to communication systems, and more particularly, to techniques for configuring resources in a multi-hop integrated access and backhaul (IAB) network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, for NR communications technology and beyond, flexibility in the use of the time/frequency resources for an IAB node is limited. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for wireless communications by a network entity is described that include determining a topological state of one or more of a parent node or a child node, determining a scheduling gap value for a set of resources, including a resource for the child node, based on the topological state of one or more of the parent node or the child node, and transmitting a configuration to the parent node for communicating with the child node based at least in part on the scheduling gap value.

In an aspect, a network entity for wireless communications is described. The network entity includes a memory storing instructions and a processor coupled with the memory. The processor is configured to execute the instructions to: determine a topological state of one or more of a parent node or a child node; determine a scheduling gap value for a set of resources, including a resource for the child node, based on the topological state of one or more of the parent node or the child node; and transmit a configuration to the parent node for communicating with the child node based at least in part on the scheduling gap value.

In an aspect, a network entity for wireless communications is described. The network entity includes: means for determining a topological state of one or more of a parent node or a child node; means for determining a scheduling gap value for a set of resources, including a resource for the child node, based on the topological state of one or more of the parent node or the child node; and means for transmitting a configuration to the parent node for communicating with the child node based at least in part on the scheduling gap value.

In an aspect, a computer-readable medium storing computer executable instructions for wireless communications by a network entity is described. The computer-readable medium comprising: instructions to determine a topological state of one or more of a parent node or a child node; instructions to determine a scheduling gap value for a set of resources, including a resource for the child node, based on the topological state of one or more of the parent node or the child node; and instructions to transmit a configuration to the parent node for communicating with the child node based at least in part on the scheduling gap value.

In another aspect, a method for wireless communications by a parent node is described that include receiving a configuration for communicating with a child node based at least in part on a first scheduling gap value for a set of resources, including a resource for the child node, based on a topological state of one or more of the parent node or the child node, wherein the resource is indicated as a soft resource, determining a resource type of the resource for the child node, determining a second scheduling gap value for the set of resources based on one or more of the first scheduling gap value or the resource type of the resource for the child node, and transmitting the second scheduling gap value to the child node.

In another aspect, a parent node for wireless communications is described. The parent node includes a memory storing instructions and a processor coupled with the memory. The processor is configured to execute the instructions to: receive a configuration for communicating with a child node based at least in part on a first scheduling gap value for a set of resources, including a resource for the child node, based on a topological state of one or more of the parent node or the child node, wherein the resource is indicated as a soft resource; determine a resource type of the resource for the child node; determine a second scheduling gap value for the set of resources based on one or more of the first scheduling gap value or the resource type of the resource for the child node; and transmit the second scheduling gap value to the child node.

In another aspect, a parent node for wireless communications is described. The parent node includes: means for receiving a configuration for communicating with a child node based at least in part on a first scheduling gap value for a set of resources, including a resource for the child node, based on a topological state of one or more of the parent node or the child node, wherein the resource is indicated as a soft resource; means for determining a resource type of the resource for the child node; means for determining a second scheduling gap value for the set of resources based on one or more of the first scheduling gap value or the resource type of the resource for the child node; and means for transmitting the second scheduling gap value to the child node.

In another aspect, a computer-readable medium storing computer executable instructions for wireless communications by a parent node is described. The computer-readable medium comprising: instructions to receive a configuration for communicating with a child node based at least in part on a first scheduling gap value for a set of resources, including a resource for the child node, based on a topological state of one or more of the parent node or the child node, wherein the resource is indicated as a soft resource; instructions to determine a resource type of the resource for the child node; instructions to determine a second scheduling gap value for the set of resources based on one or more of the first scheduling gap value or the resource type of the resource for the child node; and instructions to transmit the second scheduling gap value to the child node.

In another aspect, a method for wireless communications by a child node is described that include transmitting a topological state of the child node to one or more of a parent node or a central entity, and receiving a configuration for communicating with the parent node based at least in part on a scheduling gap value for a set of resources, including a resource for the child node, based on the topological state of the child node, wherein the resource is indicated as a soft resource.

In another aspect, a child node for wireless communications is described. The child node includes a memory storing instructions and a processor coupled with the memory. The processor is configured to execute the instructions to: transmit a topological state of the child node to one or more of a parent node or a central entity; and receive a configuration for communicating with the parent node based at least in part on a scheduling gap value for a set of resources, including a resource for the child node, based on the topological state of the child node, wherein the resource is indicated as a soft resource.

In another aspect, a child node for wireless communications is described. The child node includes: means for transmitting a topological state of the child node to one or more of a parent node or a central entity; and means for receiving a configuration for communicating with the parent node based at least in part on a scheduling gap value for a set of resources, including a resource for the child node, based on the topological state of the child node, wherein the resource is indicated as a soft resource.

In another aspect, a computer-readable medium storing computer executable instructions for wireless communications by a child node is described. The computer-readable medium comprising: instructions to transmit a topological state of the child node to one or more of a parent node or a central entity; and instructions to receive a configuration for communicating with the parent node based at least in part on a scheduling gap value for a set of resources, including a resource for the child node, based on the topological state of the child node, wherein the resource is indicated as a soft resource.

Each of the aspects described above can also be implemented using means for performing the various functions described in connection with those aspects.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 is an example of an integrated access and backhaul (IAB) network that may be a part of the wireless communications system and access network of FIG. 1;

FIG. 12 is a flowchart of another example method of wireless communications;

FIG. 13 is a flowchart of another example method of wireless communications;

DETAILED DESCRIPTION

Figure 1:
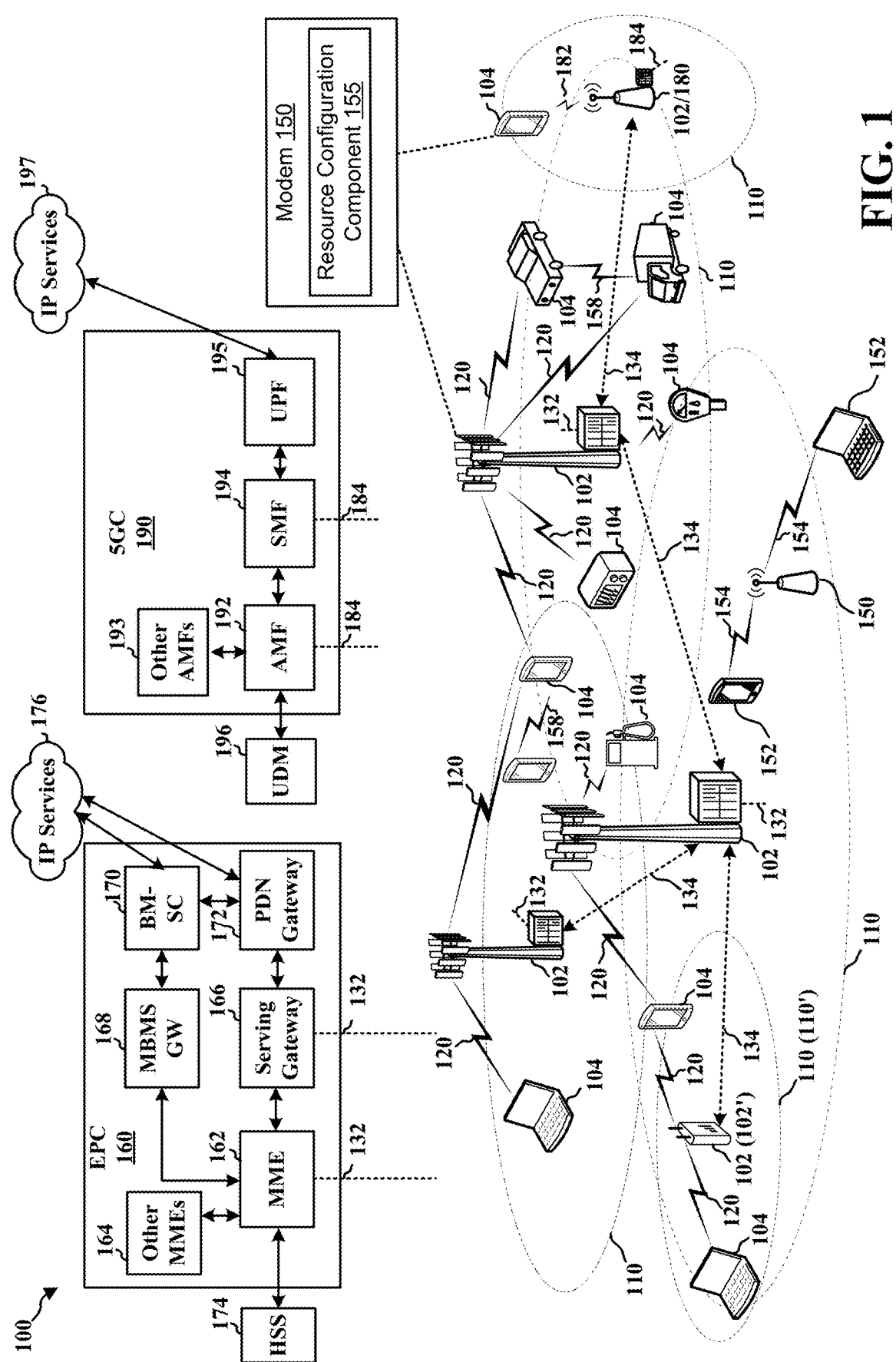
FIG. 1 is an example of a wireless communications system and an access network.

The present disclosure describes techniques for configuring resources in a multi-hop integrated access and backhaul (IAB) network. In an aspect, for example but not limited hereto, the present disclosure includes configuring a scheduling gap value that defines a gap (e.g., number of slots) between a control resource and a data resource to be hop dependent, which may mean that that the gap is dependent on a node's relationship (e.g., a number of nodes) from a parent node within a chain of nodes. Hop dependency may allow soft resources of one or more children nodes in a multi-hop chain of nodes in the IAB network to be reconfigured. For instance, these aspects may be used in situations in which a number of nodes in the multi-hop chain of nodes are configured for soft resources in a same time-frequency, as will be explained below in more detail. These techniques may be implemented as methods, apparatuses, computer-readable media, and means for wireless communications.

In a 5G NR network, different resource direction types may be assigned to the resources. For example, a time-domain resource may be assigned to one of the following resource types: a downlink (DL) resource where only a downlink communication is allowed at this resource (e.g., synchronization signal physical broadcast channel (SSB), channel state information reference signal (CSI-RS), physical DL control channel (PDCCH), and/or physical DL shared channel (PDSCH)); a uplink (UL) resource where only an uplink communication is allowed at this resource (e.g., physical random access channel (PRACH), physical UL control channel (PUCCH), physical UL shared channel (PUSCH), and/or sounding reference signal (SRS)); or a flexible resource where communication direction at this resource can be overwritten to DL or UL later by a scheduling node.

The 5G NR network may support layers of DL, UL, and/or Flexible assignment in different ways, such as via explicit configuration or implicit configuration. For example, a network may use semi-static slot configuration to explicitly configure resources, such as, but not limited to, by way of radio resource control (RRC) messages. These messages may be cell-specific (e.g., tdd-UL-DL-ConfigurationCommon in system information block (SIB)) or user equipment (UE)-specific (e.g., tdd-UL-DL-Configuration-Dedicated in UE-specific RRC message). In another example, the network may use a dynamic slot format indicator (SFI) carried by a group-common PDCCH (GC-PDCCH) to explicitly configure resources. Alternatively, in some examples, a DL/UL direction may be implied, such as by semi-static channel allocation using RRC messages or, for example, the DL/UL direction may be implied by a dynamic DL control information (DCI) scheduling grant carried by PDCCH.

In an aspect, overwriting rules between different layers of assignment approaches may be defined in a 5G NR network. In an example, flexible resources in a semi-static slot configuration may be overwritten to DL or UL symbols by an SFI or implicit indication, as described above. In another example, flexible resources in SFI can be overwritten to DL or UL by a dynamic DCI grant. Additionally, in some examples, semi-static channel allocation with an implied DL or UL direction may be cancelled by SFI that indicates the resource is flexible.

While 5G NR networks may provide some flexibility in configuring resources, this disclosure provides various techniques to expand on resource configuration such that resources may be explicitly or implicitly configured in a multi-hop IAB network. In particular, in a multi-hop network, scheduling gaps between resources (e.g., between PDDCH and PDSCH or between PDDCH and PUSCH) may be hop dependent to reconfigure resources for particular nodes.

Various aspects are now described in more detail with reference to the FIGS. 1-15. In the following description, for purposes of explanation, numerous specific details are set forth in order to provide a thorough understanding of one or more aspects. It may be evident, however, that such aspect(s)

may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, an example of a wireless communications system and an access network 100 (also referred to as a wireless wide area network (WWAN)) may include a core network (e.g., an EPC 160 and/or a 5G core ("5GC") 190) in communication with one or more base stations 102, which are in communication with one or more user equipments (UEs) 104, where certain configurations of the base stations 102 and UEs 104 may act as nodes in a multi-hop IAB network. In an example, a network device in the core network, the base stations 102, and/or the UEs 104 may include one or more components, such as modem 150 and/or resource configuration component 155, that operate to configure resources in a multi-hop IAB network. In particular, the modem 150 and/or the resource configuration component 155 may operate to configure a scheduling gap value that defines a gap (e.g., number of slots) between a control resource and a data resource to be hop dependent, which allows soft resources (defined below) of one or more children nodes in a multi-hop chain of nodes in the IAB network to be reconfigured. For instance, these aspects may be used in situations in which a number of nodes in the multi-hop chain of nodes are configured for soft resources in a same time-frequency.

The base stations 102 may include macro cells (high power cellular base station) and/or small cells (low power cellular base station). Examples of macro cells may include cell towers and antenna towers. Examples of the small cells may include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104.

Examples of the UE 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIG. 2, one or more of the base stations 102 and/or the UEs 104 of FIG. 1 may be a part of an IAB network, such as example of an IAB network 200. 5G NR technologies, such as mmWave, may be used to support access networks which include connections between access nodes (AN), e.g., base stations 102, and UEs 104 and backhaul networks, which include connections between ANs/base stations 102. A backhaul network may include one or more IAB-donors having an AN with wireline connection to a core network and one more IAB-nodes. The IAB node may include an AN having a wireless backhaul. The AN of the IAB node may relay traffic from/to an anchor node through one or multiple hops. An IAB-donor may be a node that is at the root of a topology of an architecture (or the highest level of a hierarchy) adopted by the IAB network 200. The IAB network 200 may share the resources between an access network and a backhaul network. In the IAB network 200 of this disclosure, reuse of framework for an access network is desired as much as possible.

In some examples, the IAB network 200 may include a central entity (as referred to as a central unit (CU)) having a placement within the IAB network that is dependent on the architecture adopted by the IAB network. For example, in one aspect the central entity may be a part of the IAB-donor and each IAB node may include a distributed unit (DU). In another example, each IAB-node of the IAB network may comprise both a central entity and a DU.

Figure 3:
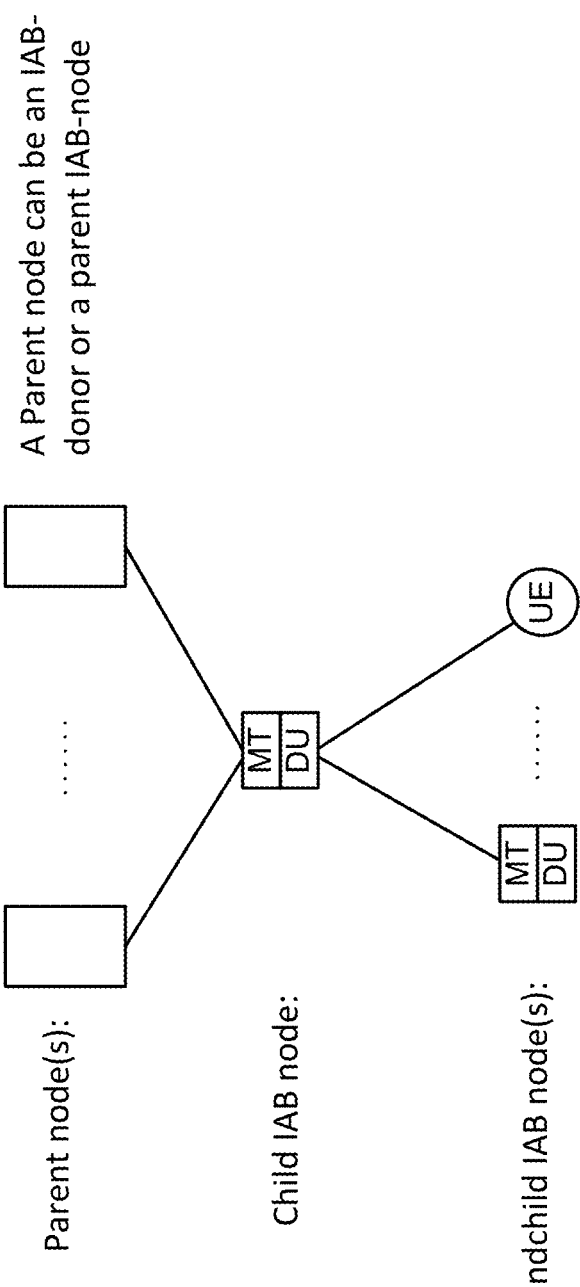
FIG. 3 is an example of a chain of nodes in the IAB network of FIG. 2.

Referring to FIG. 3, an example of a network chain 300 of the IAB network 200 includes an IAB node that may be linked to one or more parent nodes and one or more child nodes (where the use of "parent" and "child" is relative to the particular node of interest in the multi-hop chain of nodes). In the example of FIG. 3, the IAB node of interest may be referred to as a child IAB node, which is linked to one or more parent nodes and one or more grandchild nodes. The child IAB node may have at least two functions, such as a mobile-termination (MT) function, which enables the node to operate as a scheduled node similar to a UE scheduled by a parent node. In an example, a parent node may be an IAB-donor or a parent IAB-node. The child IAB node may also include a distributed unit (DU) function, which enables the node to operate as a scheduling node that schedules child nodes (i.e., grandchild nodes in this case) of the child IAB-node. In an example, the grandchild node may be a UE or a grandchild IAB-node.

Resource types for IAB-Networks such as IAB network 200 may be configured based on whether the child IAB node acts as an MT or a DU. From an MT point-of-view, time-domain resources may be indicated for a parent link (i.e., a link between parent node and child IAB node) as a DL time resource, a UL time resource, or a flexible time resource. From a DU point-of-view, a child link (i.e., a link between child IAB node and grandchild IAB node) may have a resource type such as a DL time resource, a UL time resource, a flexible time resource, or an unavailable time resource, meaning that the resource is not to be used for communication on DU child links.

For each of the DL, UL, and flexible time resource types of a DU child link, the time resource types may be considered either a hard resource type or a soft resource type. A hard resource type (or hard resource) indicates that the corresponding time resource is always available for the DU child link. A soft resource type (or soft resource) indicates that the availability of the corresponding time resource for the DU child link is explicitly and/or implicitly controlled by a parent IAB node.

Figure 4:
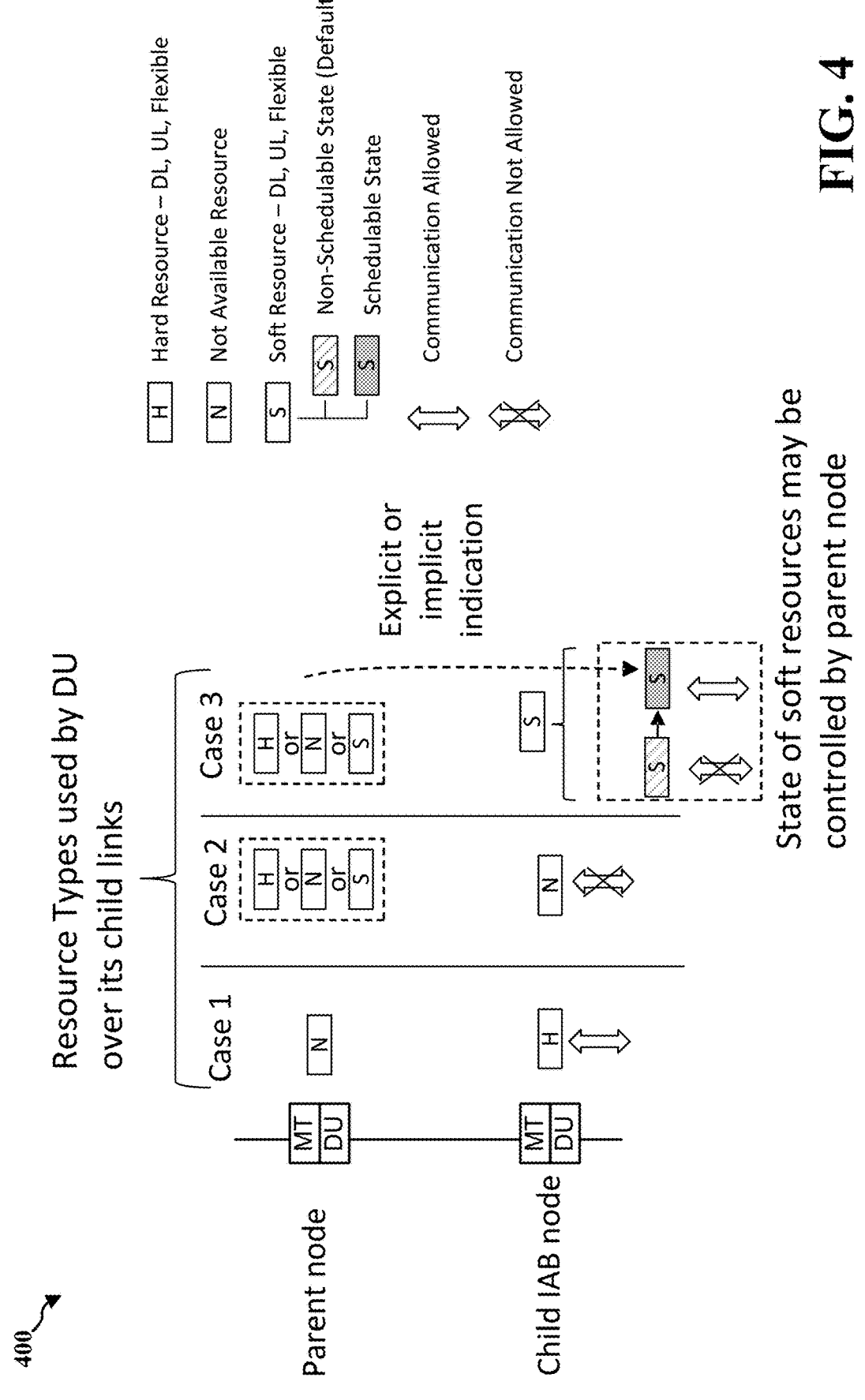
FIG. 4 is an example of resource types for a chain of nodes in the IAB network.

Referring to FIG. 4, a multi-hop chain 400 of an IAB network includes examples of different possible resource types and use cases at different nodes in the chain.

In a first case ("Case 1"), a resource for the parent node may be configured as an unavailable resource (e.g., "N"), and a corresponding resource for the child IAB node may be configured as a hard resource (e.g., "H"). In the first case, communications by the child IAB node using the resource are allowed based on the type of the hard resource (e.g., UL, DL, or Flexible communications). In a second case ("Case 2"), the resource for the parent node may be configured as either one of a hard resource, an unavailable resource, or a soft resource (e.g., "S"), and a corresponding resource for the child IAB node may be configured as an unavailable resource. In the second case, communications by the child IAB node using the resource are not allowed since the resource is not available for use.

In a third case ("Case 3"), the resource for the parent node may be configured as either one of a hard resource, an unavailable resource, or a soft resource, and a corresponding resource for the child IAB node may be configured as a soft resource. In the third case, communications by the child IAB node using the resource may not be allowed when the soft resource is in a non-schedulable state but may be allowed when the soft resource is in a schedulable state. In some examples, the state of the soft resource may be controlled by the parent node either explicitly or implicitly.

To control soft resources of the child IAB node, the parent node may explicitly control a soft resource by informing the child IAB node to re-configure the soft resource. For example, but not limited hereto, explicit control may be through PDCCH signaling or media access control (MAC)-control element (CE) (MAC-CE) signaling. Implicit control of a soft resource by the parent node may be performed by the parent node by not informing the child IAB node of a scheduling decision. For example, the parent node may not schedule the soft resource ahead of time.

Time domain allocation for PDSCH may allow a slot to be allocated based on the equation $$n * \frac{2^{U_{PDSCH}}}{2^{U_{PDDCH}}} + K0,$$

where n is the slot with the scheduling DCI, and K0 is the scheduling gap value (or slot offset) based on the numerology of PDSCH, $U_{PDSCH}$ and $U_{PDDCH}$ are the subcarrier spacing configurations for PDSCH and PDDCH, respectively.

Time domain allocation for PUSCH may allow a slot to be allocated based on similar scenarios as the PDSCH.

Figure 5:
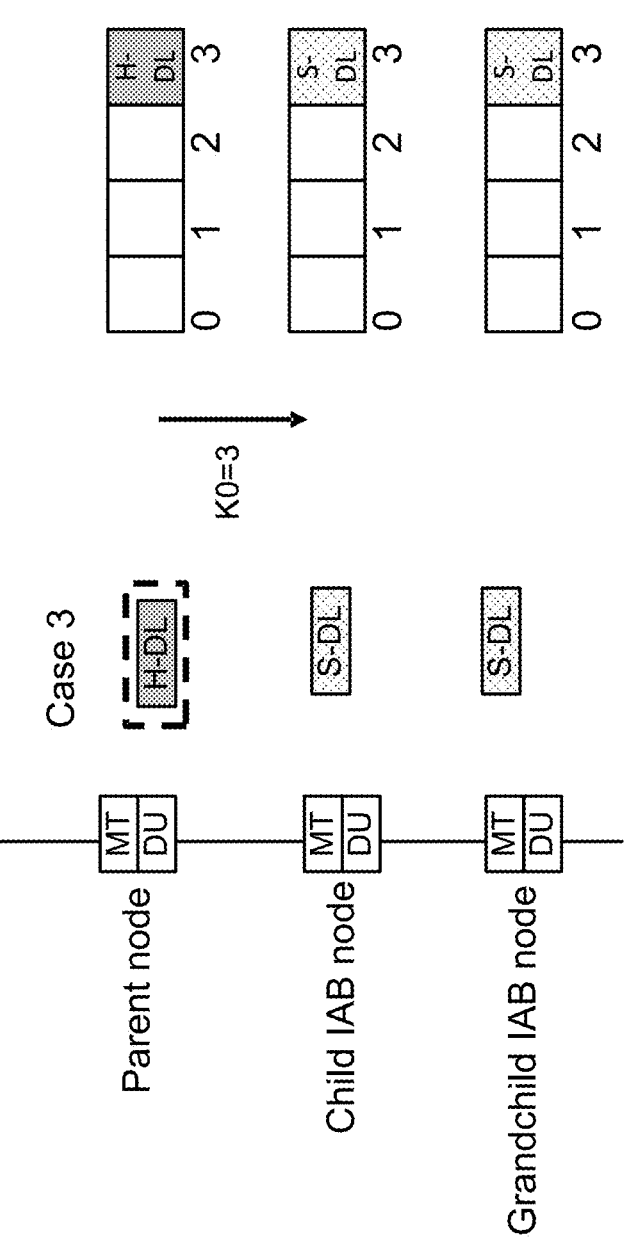
FIG. 5 is an example of scheduling gap values in a chain of nodes in the IAB network.

Referring to FIG. 5, a diagram 500 includes an example of configuring scheduling gap values in the case 3. In this example, an IAB network may include a multi-hop chain of nodes having a parent node, a child IAB node, and a grandchild IAB node. In an example, a central entity (not shown) may also be included and in communication with one or more of the nodes, such as at least with the parent node. In some examples the central entity may be a part of the parent node such as when the parent node is an IAB-donor. In some examples, the central entity may be located above the parent node (e.g., grandparent IAB node or great-grandparent IAB node) when the parent node is an IAB-node (e.g., an intermediate relay).

The central entity or the parent node may configure a scheduling gap value between resources. The scheduling gap value may represent a number of slots between resources such as data and control resources. For example, the scheduling gap value may include a number of slots between a PDCCH and a PDSCH (i.e., K0 value), or a number of slots between the PDCCH and the PUSCH (i.e., K2 value). For the sake of brevity, examples throughout the disclosure will describe the K0 value. However, a person skilled in the art would recognize that the techniques described herein are not limited to the K0 value. As illustrated by FIG. 5, a scheduling gap value of a link between the parent node and the child IAB node may be configured to a first value (e.g., K0=3).

In some examples, the central entity or the parent node may configure the scheduling gap value based on a topological state of nodes (e.g., parent node, child IAB node) in the network chain of nodes. In an example, the topological state may indicate a relationship (e.g., hierarchal architecture) of a node to another node within the network chain. In an example, the topological state may be indicated by one or more of a hop level (e.g., number of nodes from another node, such as the parent node, within the network chain), a depth of a subtree rooted at the parent node or the child IAB node, a number of nodes within the network chain of the parent node and the child IAB node, a resource pattern of one or more of the parent node or the child IAB node, or any other technique(s) to show a quantitative relationship between nodes within the network chain.

In some examples, the central entity or the parent node may configure the scheduling gap value based on signaling from the child IAB node. For example, the child IAB node may transmit an RRC message to indicate a requested scheduling gap value.

In some examples, the central entity or the parent node may configure the scheduling gap value based on preconfigured rules. For example, the central entity may include one or more preconfigured rules (implicit or explicit) indicating a scheduling gap value for nodes within the network chain of nodes. Examples of the preconfigured rules are described herein in relation to FIGS. 7-9.

In some examples, the central entity or the parent node may configure the scheduling gap value based on one or more node or network characteristics. For example the one or more node or network characteristics may include one or more of a traffic demand within a network including the parent node and the child IAB node, a resource utilization, capabilities of one or more of the parent node or the child node, or a type of communication between the parent node and the child IAB node.

The central entity or the parent node may also preset resources to be a predetermined resource type, such as hard or soft and DL, UL, or flexible. For example, as shown by FIG. 5, the central entity may preset the resource in the fourth slot for the parent node to be a hard DL (H-DL) resource, the resource in the fourth slot for the child IAB node to be a soft DL (S-DL) resource, and the resource in the fourth slot for the grandchild IAB node to be a soft DL (S-DL) resource. Based on this configuration, the child IAB node may configure the grandchild IAB node for DL resources in the fourth slot explicitly or implicitly.

Figure 6:
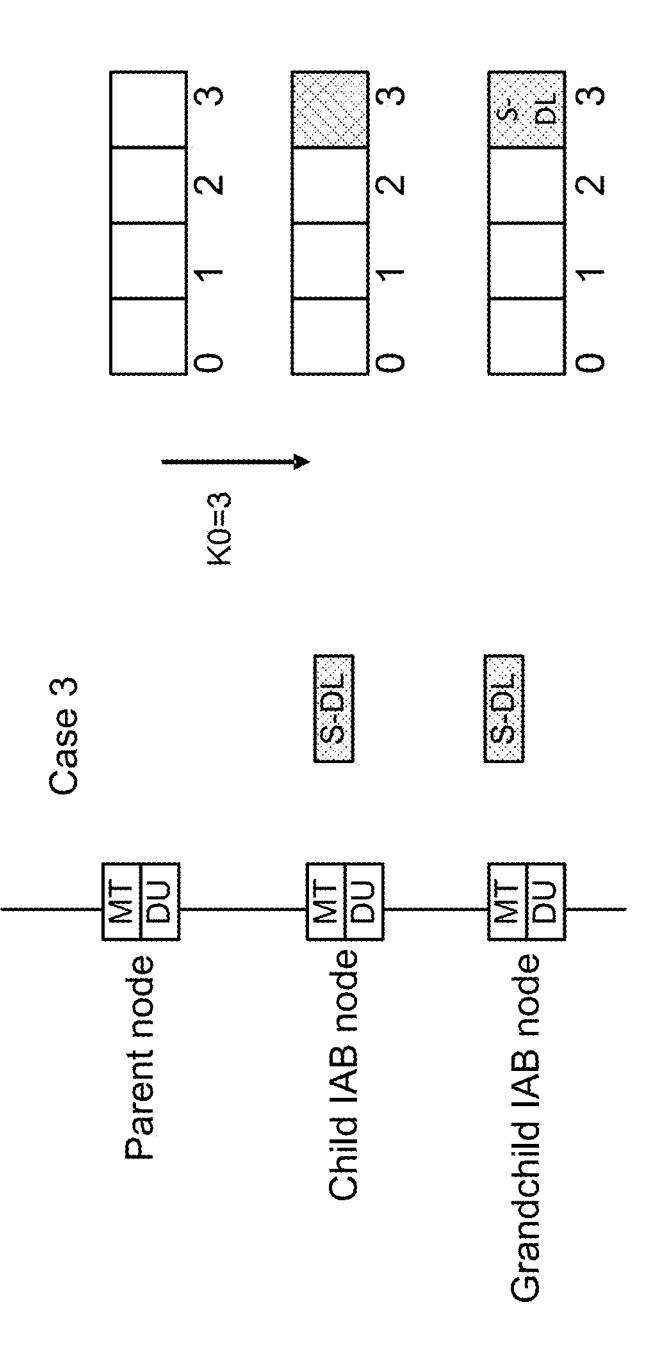
FIG. 6 is another example of scheduling gap values in a chain of nodes in the IAB network.

Referring to FIG. 6, a diagram 600 includes an example of configuring scheduling gap values in the case 3 when a scheduling grant has not been received by the child IAB node, which implicitly configures a predetermined resource. In this example, the parent node may not transmit the scheduling grant to the child IAB node by the end of the first slot (e.g., slot index number 0). By not receiving the scheduling grant by the end of the first slot (e.g., slot 0), and based on the scheduling gap value of 3, the parent node implicitly indicates to the child IAB node that the parent node will not schedule any particular DL data for a predetermined resource, the fourth slot (e.g., slot index number 3) in this case. Thus, the child IAB node may determine that the parent node will not schedule the DL data when the child IAB node has not received a scheduling grant by the end of the first slot (e.g., slot index number 0).

In response to determining that no scheduling grant was received by the end of the first slot (e.g., slot 0), and based on the scheduling gap value of 3, the child IAB node may use the fourth slot (e.g., slot index number 3) for a DL transmission or release the fourth slot (e.g., slot index number 3) for the grandchild IAB node to use for a DL transmission. A determination by the child IAB node to transmit or release the predetermined slot may be based on a second scheduling gap value of a link between the child IAB node and the grandchild IAB node. In other words, the child IAB node should schedule the predetermined slot before the end of the slot as indicated by the second scheduling gap value.

Figure 7:
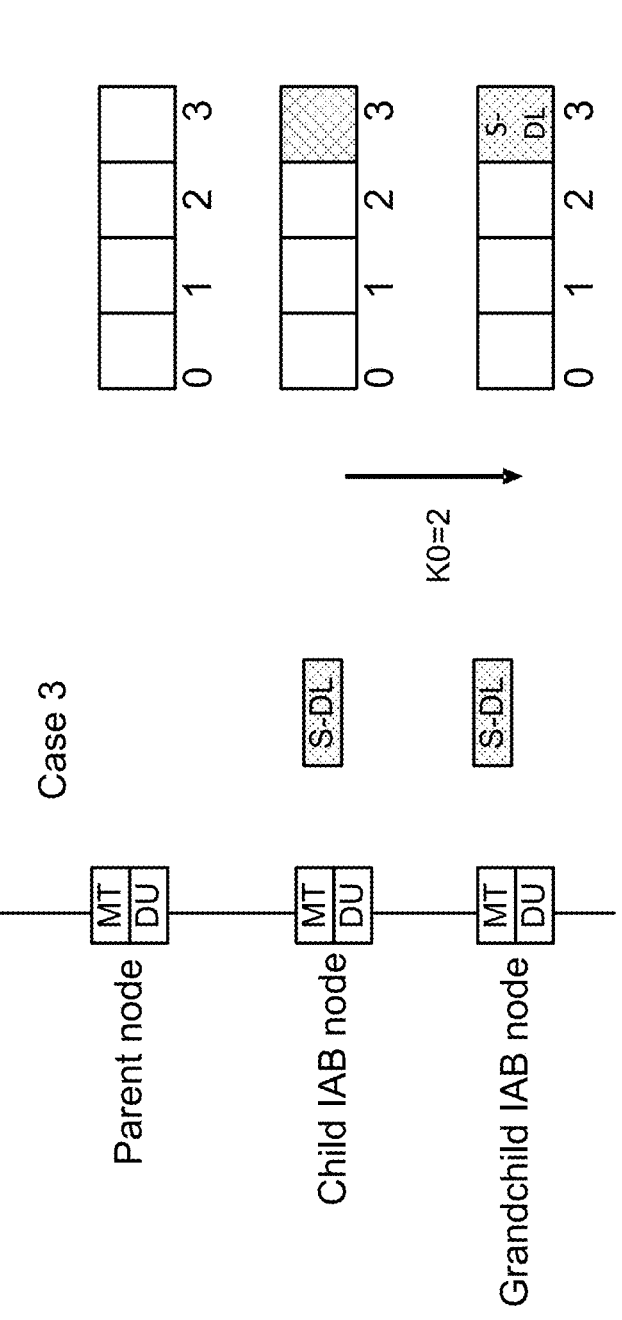
FIG. 7 is another example of scheduling gap values in a chain of nodes in the IAB network.

Referring to FIG. 7, diagram 700 includes an example of configuring the second scheduling gap value in the case 3 such that a predetermined resource for the grandchild node is implicitly released by the child IAB node. In this example, the second scheduling gap value may be preconfigured by the central entity or the parent entity to enable implicit configuration of a predetermined grandchild IAB node resource. As shown, the second scheduling gap value is set to a second value (e.g., K0=2), which is a value that is less than the first value (e.g., K0=3; e.g., see FIGS. 5 and 6). Based on this value, the child IAB node should indicate the desire to schedule a DL transmission on the predetermined slot, the fourth slot or slot index number 3, such as via a DL scheduling grant, before the end of a second slot (e.g., slot index number 1) based on the second scheduling gap value. Otherwise, the child IAB node implicitly releases the predetermined slot to the grandchild IAB node.

Figure 8:
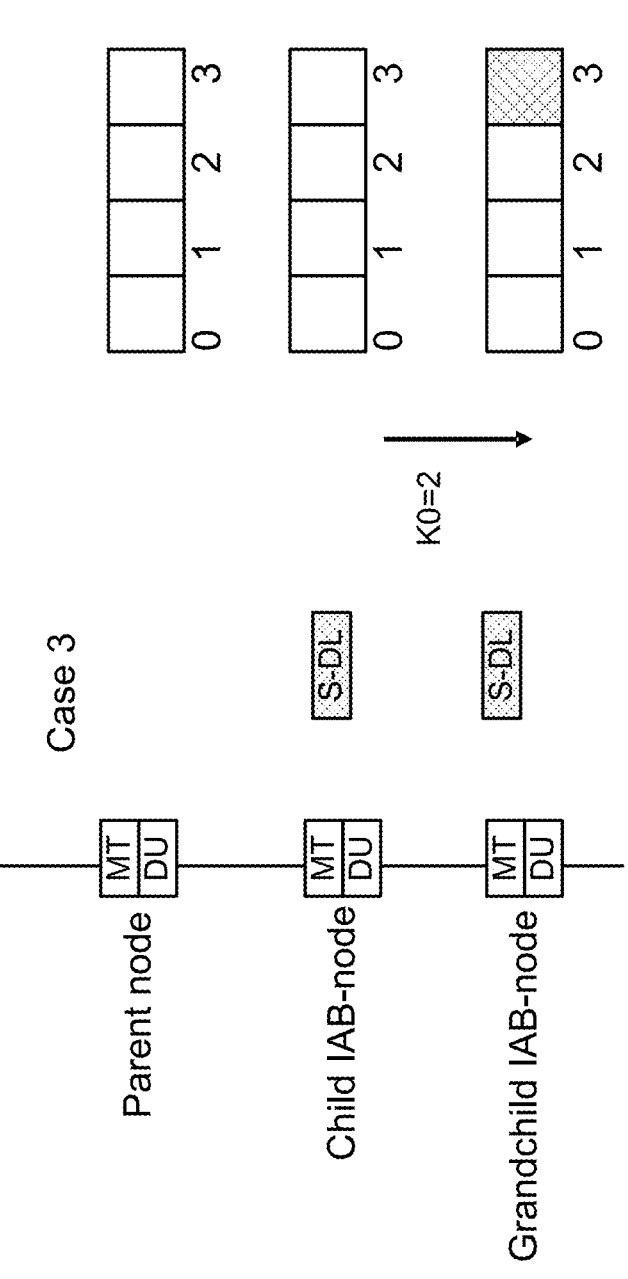
FIG. 8 is another example of scheduling gap values in a chain of nodes in the IAB network.

Referring to FIG. 8, diagram 800 includes an example of configuring scheduling gap values in the case 3 where the child IAB node makes the choice to implicitly configure a predetermined resource for use by the grandchild IAB node based on preconfiguring the scheduling gap value. In this example, the child IAB node has preconfigured the grandchild node with an updated scheduling gap value of 2, and has not provided a scheduling grant before the end of the second slot (e.g., slot index number 1). As the grandchild IAB node has not received the scheduling grant before the end of the second slot, and based on the updated scheduling gap value of 2, the grandchild IAB node is implicitly configured by the child IAB node and thus may assume that the fourth slot (e.g., slot index number 3) is available for the grandchild IAB node to use for DL transmission or to be released for a great-grandchild IAB node (see e.g., FIG. 9).

In another aspect, the scheduling gap between resources may be hop dependent to re-configure soft resources of children nodes.

Figure 9:
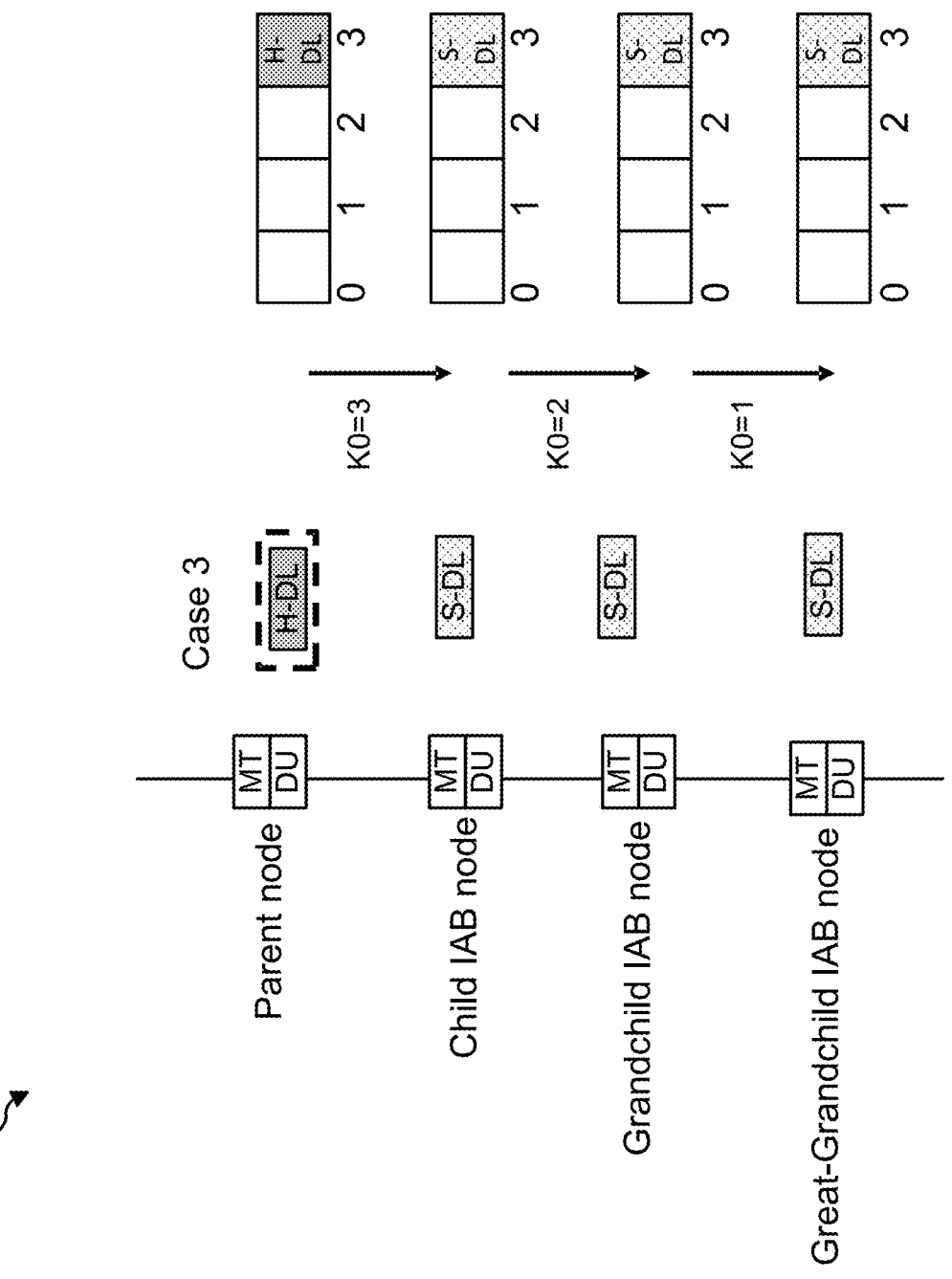
FIG. 9 is another example of scheduling gap values in a chain of nodes in the IAB network.

Referring to FIG. 9, diagram 900 includes an example of configuring scheduling gap values in case 3 where the scheduling gap values are hop dependent, e.g., in this case decrease in value as you go down the multi-hop chain of nodes. As shown by FIG. 9, if a number of nodes located in a chain are configured for soft resources in a same resource (e.g., a same time-frequency), then the soft resources of respective children nodes may be reconfigured based on hop dependent configuration of the scheduling gap values (e.g., K0) for links between nodes. In this case, the scheduling gap values may be configured with decreasing scheduling gap values based on a hop level of the node in the chain of nodes. For example, but not limited hereto, scheduling gap values for links in the network chain of nodes may decrease by at least one for each link/node, thereby enabling a respective parent node to explicitly or implicitly configured a same resource at a respective child node.

Figure 10:
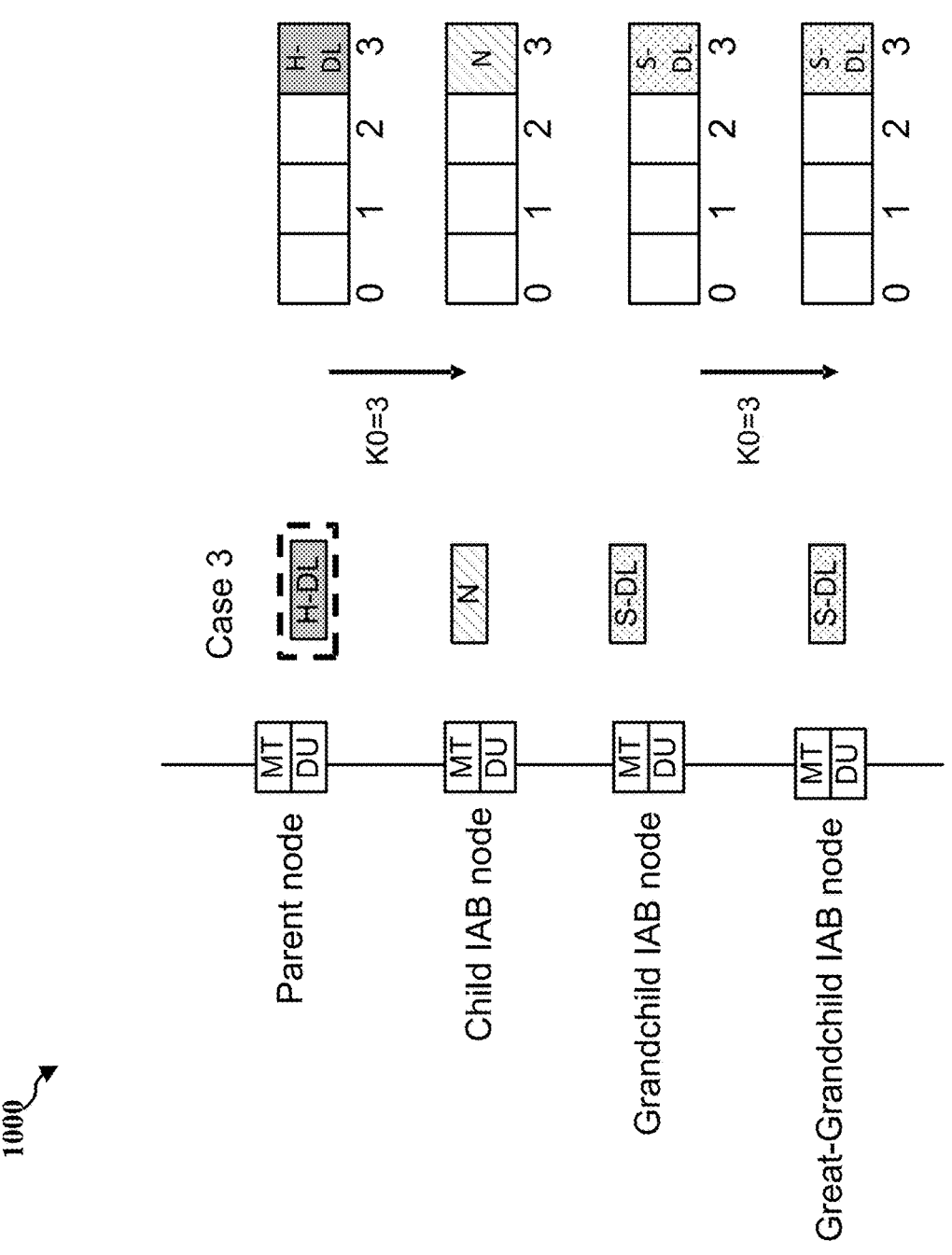
FIG. 10 is another example of scheduling gap values in a chain of nodes in the IAB network.

Referring to FIG. 10, diagram 1000 of an example of configuring scheduling gap values in the case 3 includes a resource (e.g., a same slot) being allocated as an unavailable slot for the child IAB node, which allows the grandchild IAB node to configure the great-grandchild IAB node with a scheduling gap value to enable implicit reconfiguration of the resource. In this example, the child IAB node may not be able to use the predetermined slot, the fourth slot (e.g., slot index number 3) in this case, because the slot is allocated as an unavailable resource. As such, with this knowledge (which may be communicated in an RRC or other message), the grandchild IAB node may set the scheduling gap value for the great-grandchild IAB node to a value that is the same as, or less than, the scheduling gap value between the child IAB node and the grandchild IAB node (e.g., K0=3) since the grandchild IAB node knows that it cannot be schedule on this resource. Therefore, based on this scheduling gap value, the grandchild IAB node may implicitly indicate to the great-grandchild IAB node to use the predetermined slot (e.g., slot index number 3) when the great-grandchild IAB node does not receive a scheduling grant by the end of the first slot (e.g., slot index number 0).

Figure 11:
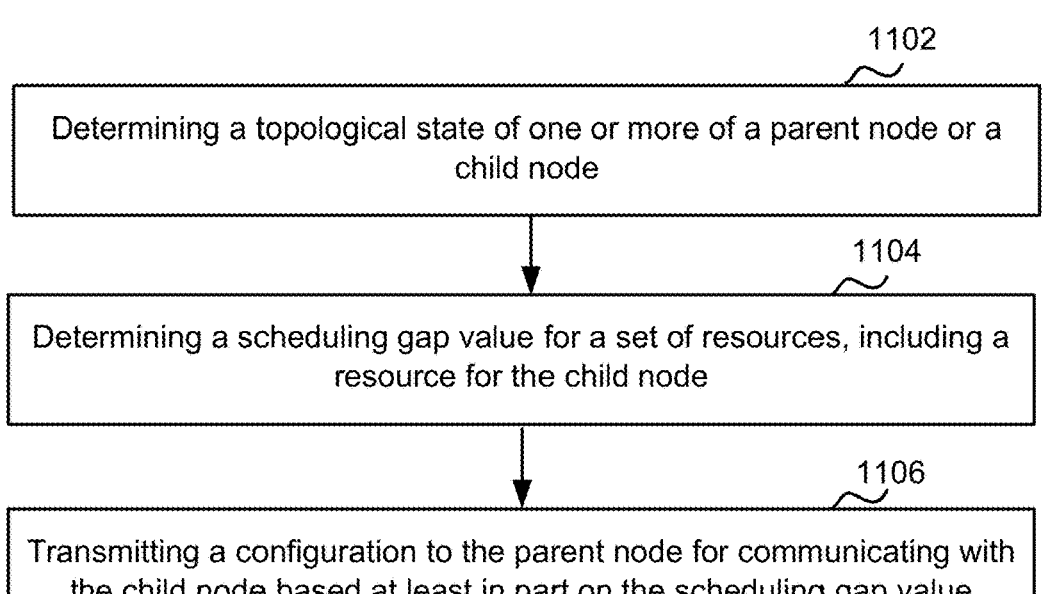
FIG. 11 is a flowchart of an example method of wireless communications.

Referring to FIG. 11, an example of a method 1100 of wireless communications may be performed by a network device to enable implicit configuration of resources in a multi-hop IAB network. Aspects of the method 1100 may be performed by one or more components of the base station 102 of FIG. 14, e.g., acting as an IAB node or central entity.

At block 1102, the method 1100 may include determining a topological state of one or more of a parent node or a child node. In an example, the base station 102, a processor(s) 1412, a memory 1416, the modem 150, the resource configuration component 155, and/or a topological state determiner component 1452 may be configured and/or may include a means for determining a topological state of one or more of a parent node or a child node, such as via messages exchanged between the nodes in the chain that identify the hop level or relative position of the node in the chain. Further examples are described above in detail. In an example the base station 102 may act as the central entity or a parent node with the IAB network.

In some examples, the topological state may be one or more of a hop-level of the parent node or the child node, a depth of a subtree rooted at the parent node or the child node, a number of nodes within a chain of the parent node and the child node, or a resource pattern of one or more of the parent node or the child node At block 1104, the method 1100 may also include determining a scheduling gap value for a set of resources, including a resource for the child node, based on the topological state of one or more of the parent node or the child node. In an example, the base station 102, the processor(s) 1412, the memory 1416, the modem 150, the resource configuration component 155, and/or a scheduling gap value determiner component 1454 may be configured and/or may include a means for determining a scheduling gap value for a set of resources, including a resource for the child IAB node, as described above in detail. For example, the scheduling gap value may be hop dependent, and may be set to a value that enables reconfiguration of a soft resource in one or more children nodes, such as when a number of nodes in the chain of nodes are configured for soft resources in the same resource (in the same time-frequency).

At block 1106, the method 1100 may further include transmitting a configuration to the parent node for communicating with the child node based at least in part on the scheduling gap value. In an example, the base station 102, the processor(s) 1412, the memory 1416, the modem 150, the resource configuration component 155, a transceiver 1402, and/or a radio frequency (RF) front end 1488 may be configured and/or may include a means for transmitting a configuration to the parent node for communicating with the child node based at least in part on the scheduling gap value, as described above in detail. For instance, the configuration may include or may indicate the scheduling gap value.

In some aspects, the resource for the child node is indicated as a soft resource and the scheduling gap value represents a number of slots before the soft resource. For example, the base station 102, the processor(s) 1412, the memory 1416, the modem 150, the resource configuration component 155, and/or a scheduling gap value determiner component 1454 may be configured and/or may include a means for indicating the resource for the child node is a soft resource and the scheduling gap value represents a number of slots before the soft resource. In some aspects, the resource for the child node is indicated as a soft resource and the scheduling gap value represents a number of slots before the soft resource. For example, the base station 102, the processor(s) 1412, the memory 1416, the modem 150, the resource configuration component 155, and/or a scheduling gap value determiner component 1454 may be configured and/or may include a means for indicating the resource for the child node is a soft resource and the scheduling gap value represents a number of slots before the soft resource. In some aspects, determining of the scheduling gap value is based on one or more preconfigured rules.

In an aspect, determining the scheduling gap value may be based on one or more of a traffic demand within a network including the parent node and the child node, a resource utilization, capabilities of one or more of the parent node or the child node, or a type of communication between the parent node and the child node. For example, the base station 102, the processor(s) 1412, the memory 1416, the modem 150, the resource configuration component 155, and/or a scheduling gap value determiner component 1454 may be configured and/or may include a means for determining the scheduling gap value based on one or more of a traffic demand within a network including the parent node and the child node, a resource utilization, capabilities of one or more of the parent node or the child node, or a type of communication between the parent node and the child node.

In some aspects, each resource of the set of resources may denote a time-frequency location. In some aspects, each of the set of resources may be indicated as one of a hard resource, a soft resource, or an unavailable resource.

In some aspects, the scheduling gap value may include a first scheduling gap value, and the method 1100 may further include determining a second scheduling gap value for the set of resources, including a resource for a grandchild node, based on the topological state. For example, the base station 102, the processor(s) 1412, the memory 1416, the modem 150, the resource configuration component 155, and/or a scheduling gap value determiner component 1454 may be configured and/or may include a means for determining a second scheduling gap value for the set of resources, including a resource for a grandchild node, based on the topological state, when the scheduling gap value includes a first scheduling gap value.

In some aspects, the second scheduling gap value may be less than or equal to the first scheduling gap value. In some aspects, the resource for the child node may be an unavailable resource, the resource for the grandchild node may be a soft resource, and the second scheduling gap value may be greater than, less than, or equal to the first scheduling gap value.

In some aspects, the method may further include determining a third scheduling gap value for the set of resources, including a resource for a great-grandchild node, based on the topological state, wherein a resource for the great-grandchild node is a soft resource. For example, the base station 102, the processor(s) 1412, the memory 1416, the modem 150, the resource configuration component 155, and/or a scheduling gap value determiner component 1454 may be configured and/or may include a means for determining a third scheduling gap value for the set of resources, including a resource for a great-grandchild node, based on the topological state, wherein a resource for the great-grandchild node is a soft resource.

In some aspects, the resource for the grandchild node may be a soft resource and the third scheduling gap value is less than or equal to one or more of the first scheduling gap value or the second scheduling gap value. In some aspects, the resource for the grandchild node may be an unavailable resource and the third scheduling gap value may be greater than, less than, or equal to one or more of the first scheduling gap value or the second scheduling gap value.

In some aspects, the scheduling gap value may relate to a gap between at least one of a PDCCH and a PDSCH, or the PDCCH and a PUSCH. wherein the scheduling gap value comprises a value of a slot offset.

Referring to FIG. 12, an example of a method 1200 of wireless communication may be performed by a parent node to reconfigure a scheduling gap value of a child node. In an example, aspects of the method 1200 may be performed by one or more components of the base station 102 shown in FIG. 14, e.g., acting as a parent IAB node. In another example, aspects of the method 1200 may be performed by one or more components of the UE 104 shown in FIG. 15, e.g., acting as a parent IAB node.

At block 1202, the method 1200 may include receiving a configuration for communicating with a child node based at least in part on a first scheduling gap value for a set of resources, including a resource for the child node, based on a topological state of one or more of the parent node or the child node, wherein the resource is indicated as a soft resource. For example, the base station 102 (e.g., processors 1412, modem 150, transceiver 1402, memory 1416, RF front end 1488, and/or resource configuration component 155) or the UE 104 (e.g., processor(s) 1512, modem 150, transceiver 1502, memory 1516, RF front end 1588, and/or resource configuration component 155) may be configured and/or may include a means for receiving a configuration for communicating with a child node based at least in part on a first scheduling gap value for a set of resources, as described above in detail.

At block 1204, the method 1200 may include determining a resource type of the resource for the child node. For example, the base station 102 (e.g., processors 1412, modem 150, memory 1416, resource configuration component 155, and/or the resource type determiner component 1462) or the UE 104 (e.g., processor(s) 1512, modem 150, a memory 1516, resource configuration component 155, and/or resource type determiner component 1562) may be configured and/or may include a means for determining a resource type of the resource for the child node, as described above in detail. In an example the resource type of the resource may be one or a hard resource, a soft resource, or an unavailable resource.

At block 1206, the method 1200 may include determining a second scheduling gap value for the set of resources based on one or more of the first scheduling gap value or the resource type of the resource for the child node. For example, the base station 102 (e.g., processors 1412, modem 150, memory 1416, resource configuration component 155, and/or scheduling gap value determiner 1452) or the UE 104 (e.g., processor(s) 1512, modem 150, memory 1516, resource configuration component 155, and/or scheduling gap value determiner component 1564) may be configured and/or may include a means for determining a second scheduling gap value for the set of resources based on one or more of the first scheduling gap value or the resource type of the resource for the child node, as described above in detail.

At block 1208, the method 1200 may include transmitting the second scheduling gap value to the child node. For example, the base station 102 (e.g., processors 1412, modem 150, transceiver 1402, memory 1416, RF front end 1488, and/or resource configuration component 155) or the UE 104 (e.g., processor(s) 1512, modem 150, transceiver 1502, memory 1516, RF front end 1588, and/or resource configuration component 155) may be configured and/or may include a means for transmitting the second scheduling gap value to the child node, as described above in detail.

Referring to FIG. 13, an example of a method 1300 of wireless communication may be performed by a child node to request configuration of a scheduling gap value. In an example, aspects of the method 1300 may be performed by one or more components of the base station 102 shown in FIG. 14, e.g., acting as a child IAB node. In another example, aspects of the method 1300 may be performed by one or more components of the UE 104 shown in FIG. 15, e.g., acting as a child IAB node.

At block 1302, the method 1300 may include transmitting a topological state of the child node to one or more of a parent node or a central entity. For example, one or more of the components of the base station 102 or the UE 104 may transmit a topological state of the child node to one or more of a parent node or a central entity, as described above in detail.

At block 1304, the method 1300 may include receiving a configuration for communicating with the parent node based at least in part on a scheduling gap value for a set of resources, including a resource for the child node, based on the topological state of the child node, wherein the resource is indicated as a soft resource. For example, the base station 102 (e.g., processors 1412, modem 150, transceiver 1402, memory 1416, RF front end 1488, and/or resource configuration component 155) or the UE 104 (e.g., processor(s) 1512, modem 150, transceiver 1502, memory 1516, RF front end 1588, and/or resource configuration component 155) may be configured and/or may include a means for receiving a configuration for communicating with the parent node based at least in part on a scheduling gap value for a set of resources, including a resource for the child node, as described above in detail.

In an aspect, the method 1300 may further include requesting for an increase in value of the scheduling gap value in response to the receiving of the configuration based at least in part on the scheduling gap value, as described above in detail. For example, the base station 102 (e.g., processors 1412, modem 150, transceiver 1402, memory 1416, RF front end 1488, and/or resource configuration component 155) or the UE 104 (e.g., processor(s) 1512, modem 150, transceiver 1502, memory 1516, RF front end 1588, and/or resource configuration component 155) may be configured and/or may include a means for requesting for an increase in value of the scheduling gap value in response to the receiving of the configuration based at least in part on the scheduling gap value.

Figure 14:
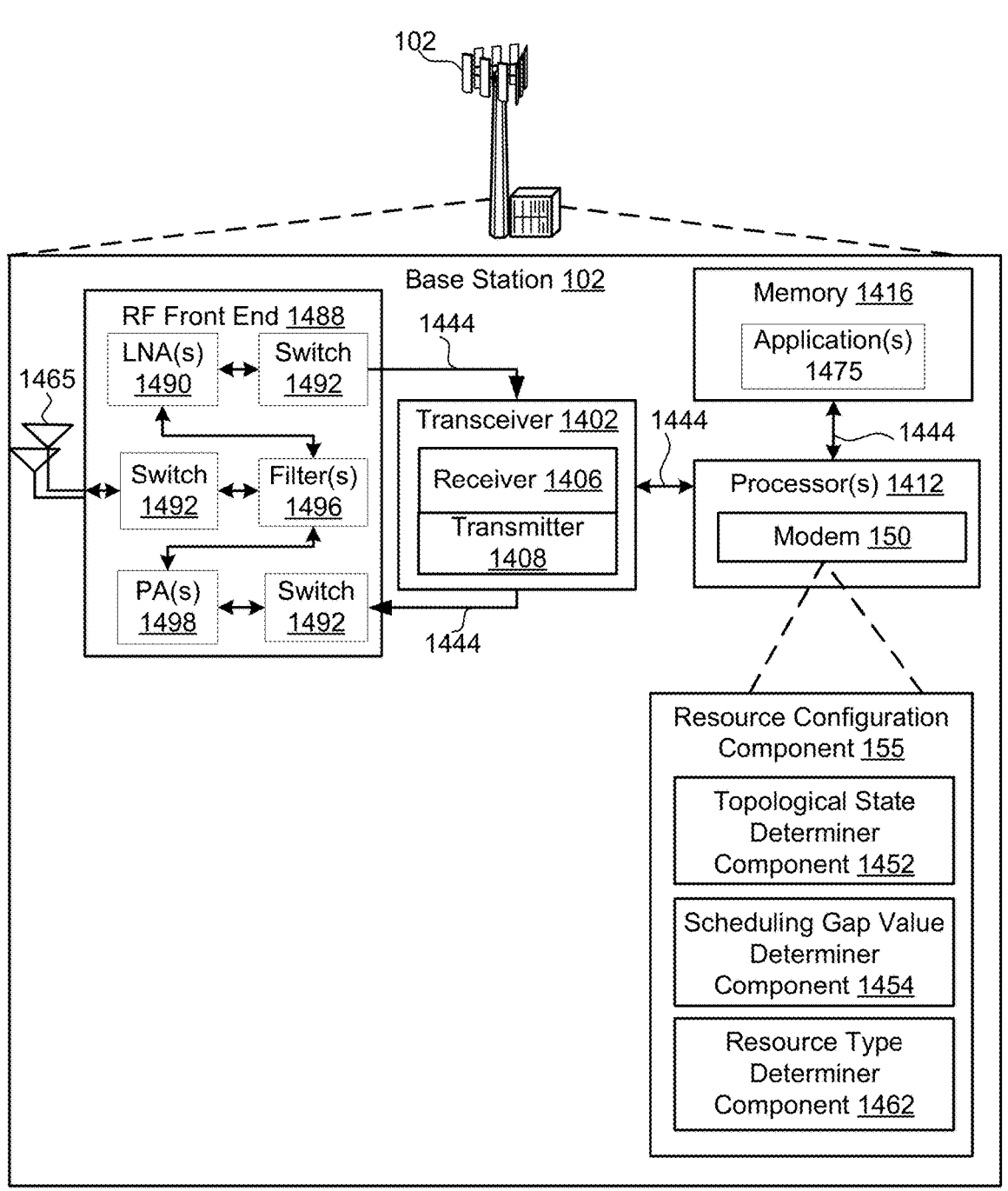
FIG. 14 is a schematic diagram of example components of a base station and/or IAB node of FIGS. 1-13.

FIG. 14 describes hardware components and subcomponents of a wireless communications device (e.g., base station 102 or network device of the core network) for implementing the techniques for configuring resources in a multi-hop IAB network provided by this disclosure. For example, one example of an implementation of the wireless communications device may include a variety of components, including components such as the processors 1412, the memory 1416, the transceiver 1402, and the modem 1414 in communication via one or more buses 1444, which may operate in conjunction with the preamble puncturing component 1450 to enable one or more of the functions described herein as well as one or more methods (e.g., methods 1100, 1200, or 1300) of the present disclosure. For example, the one or more processors 1412, the memory 1416, the transceiver 1402, and/or the modem 1414 may be communicatively coupled via the one or more buses 1444. Further, the one or more processors 1412, the modem 1414, the memory 1416, the transceiver 1402, as well the RF front end 1488, may be configured to support resource configuring operations.

In an aspect, the one or more processors 1416 may include the modem 1414 that may use one or more modem processors. The various functions related to the resource configuration component 155, the topological state determining component 1452, the scheduling gap value determining component 1454, and/or the resource type determiner component 1462, may be included in the modem 1414 and/or the one or more processors 1412 and, in an aspect, can be executed by a single processor, while in other aspects, different ones of the functions may be executed by a combination of two or more different processors. For example, in an aspect, the one or more processors 1412 may include any one or any combination of a modem processor, or a baseband processor, or a digital signal processor, or a transmit processor, or a receiver processor, or a transceiver processor associated with the transceiver 1402. In other aspects, some of the features of the one or more processors 1412 and/or the modem 1414 associated with the resource configuration component 155, the topological state determining component 1452, the scheduling gap value determining component 1454, and/or the resource type determiner component 1462 may be performed by the transceiver 1402.

Also, the memory 1416 may be configured to store data used herein and/or local versions of applications or the resource configuration component 155 and/or one or more of its subcomponents being executed by at least one processor 1412. The memory 1416 can include any type of computer-readable medium usable by a computer or at least one processor 1412, such as random access memory (RAM), read only memory (ROM), tapes, magnetic discs, optical discs, volatile memory, non-volatile memory, and any combination thereof. In an aspect, for example, the memory 1416 may be a non-transitory computer-readable storage medium that stores one or more computer-executable codes defining the resource configuration component 155 and/or one or more of its subcomponents, and/or data associated therewith, when the wireless communications device is operating at least the processors 1412 to execute the resource configuration component 155, the topological state determining component 1452, the scheduling gap value determining component 1454, the resource type determiner component 1462, and/or one or more of its subcomponents.

The transceiver 1402 may include at least one receiver 1406 and at least one transmitter 1408. The receiver 1406 may include hardware, firmware, and/or software code executable by a processor for receiving data, the code comprising instructions and being stored in a memory (e.g., computer-readable medium). The receiver 1406 may be, for example, an RF receiver. In an aspect, the receiver 1406 may receive signals transmitted by at least one wireless communications device (e.g., another base station 102 or UE 104). Additionally, the receiver 1406 may process such received signals, and also may obtain measurements of the signals, such as, but not limited to, Ec/Io, SNR, RSRP, RSSI, etc. The transmitter 1408 may include hardware, firmware, and/or software code executable by a processor for transmitting data, the code comprising instructions and being stored in a memory (e.g., computer-readable medium). A suitable example of the transmitter 1408 may include, but is not limited to, an RF transmitter.

Moreover, in an aspect, the wireless communications device may include the RF front end 1488 mentioned above, which may operate in communication with the one or more antennas 1465 and the transceiver 1402 for receiving and transmitting radio transmissions. The RF front end 1488 may be connected to the one or more antennas 1465 and can include one or more low-noise amplifiers (LNAs) 1490, one or more switches 1492, one or more power amplifiers (PAs) 1498, and one or more filters 1496 for transmitting and receiving RF signals.

In an aspect, the LNA 1490 can amplify a received signal at a desired output level. In an aspect, each LNA 1490 may have a specified minimum and maximum gain values. In an aspect, the RF front end 1488 may use the one or more switches 1492 to select a particular LNA 1490 and its specified gain value based on a desired gain value for a particular application.

Further, for example, the one or more PA(s) 1498 may be used by the RF front end 1488 to amplify a signal for an RF output at a desired output power level. In an aspect, each PA 1498 may have specified minimum and maximum gain values. In an aspect, the RF front end 1488 may use the one or more switches 1492 to select a particular PA 1498 and its specified gain value based on a desired gain value for a particular application.

Also, for example, the one or more filters 1496 may be used by the RF front end 1488 to filter a received signal to obtain an input RF signal. Similarly, in an aspect, for example, a respective filter 496 can be used to filter an output from a respective PA 1498 to produce an output signal for transmission. In an aspect, each filter 1496 can be connected to a specific LNA 1490 and/or PA 1498. In an aspect, the RF front end 1488 can use one or more switches 1492 to select a transmit or receive path using a specified filter 1496, LNA 1490, and/or PA 1498, based on a configuration as specified by the transceiver 1402 and/or the one or more processors 1412.

As such, the transceiver 1402 may be configured to transmit and receive wireless signals through the one or more antennas 1465 via the RF front end 1488. In an aspect, the transceiver 1402 may be tuned to operate at specified frequencies. In an aspect, for example, the modem 1414 can configure the transceiver 1402 to operate at a specified frequency and power level based on the configuration of the wireless communications device or the base station 102 and the communication protocol used by the modem 1414.

In an aspect, the modem 1414 can be a multiband-multimode modem, which can process digital data and communicate with the transceiver 1402 such that the digital data is sent and received using the transceiver 1402. In an aspect, the modem 1414 can be multiband and be configured to support multiple frequency bands for a specific communications protocol. In an aspect, the modem 1414 can be multimode and be configured to support multiple operating networks and communications protocols. In an aspect, the modem 1414 can control one or more components of the wireless communications device (e.g., RF front end 1488, transceiver 1402) to enable transmission and/or reception of signals based on a specified modem configuration. In an aspect, the modem configuration may be based on the mode of the modem and the frequency band in use. In another aspect, the modem configuration may be based on base station configuration information associated with the wireless communications device.

Figure 15:
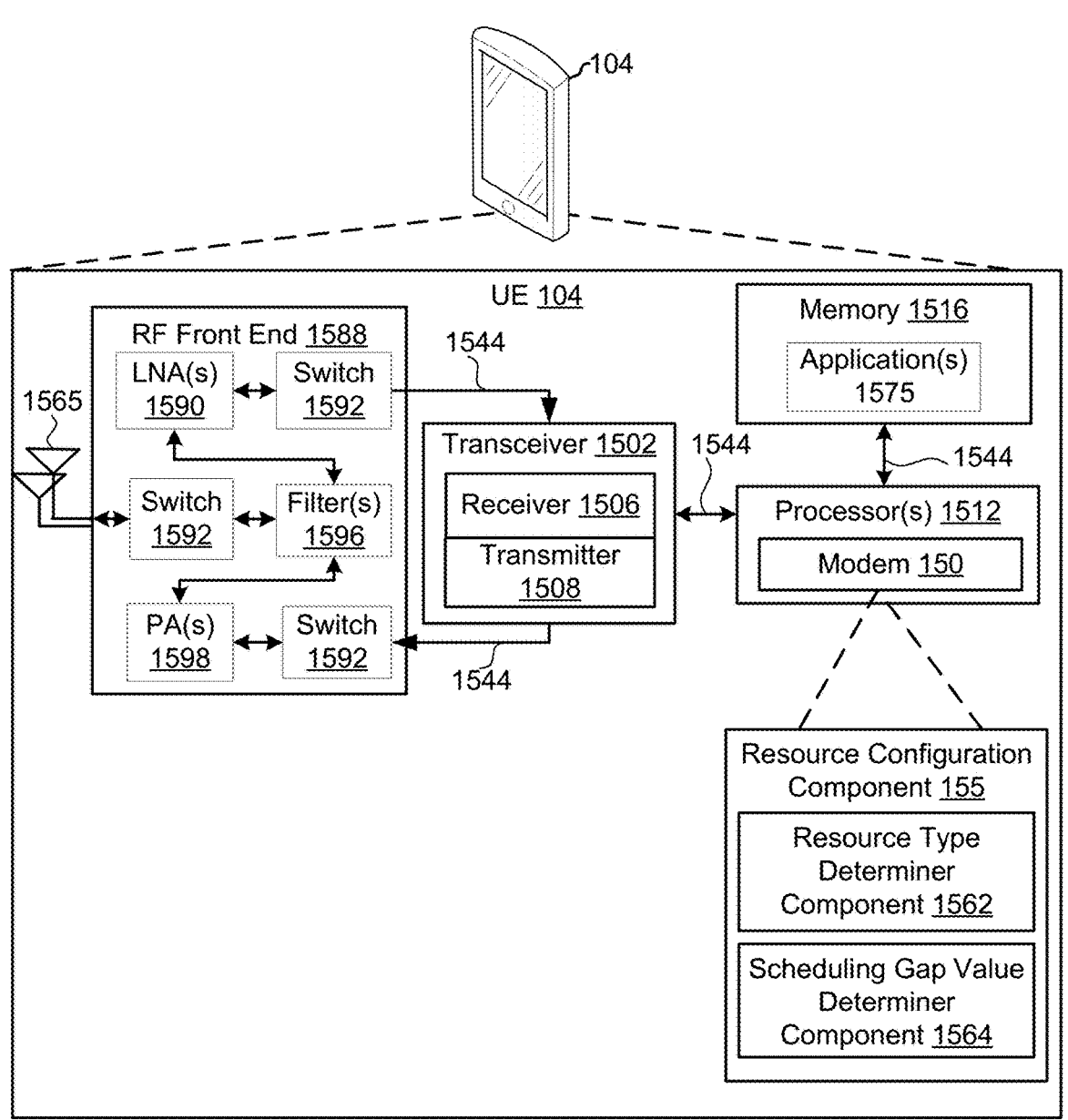
FIG. 15 is a schematic diagram of example components of a user equipment (UE) and/or IAB node of FIGS. 1-13.

FIG. 15 describes hardware components and subcomponents of an UE 104 for implementing the techniques for resource configuration provided by this disclosure. The UE 104 may include the processors 1512, the memory 1516, the modem 1514, and the transceiver 1502, which may communicate between them using a bus 1544. For example, the one or more processors 1512, the memory 1516, the transceiver 1502, and/or the modem 1514 may be communicatively coupled via the one or more buses 1544. The transceiver 1502 may include a receiver 1506 and a transmitter 1508. Moreover, the UE 104 may include the RF front end 1588 and one or more antennas 1565, where the RF front end 1588 may include LNA(s) 1590, switches 1592, filters 1596, and PA(s) 1598. Each of these components or subcomponents of the UE 104 may operate in a similar manner as the corresponding components described above in connection with the wireless communications device of FIG. 14.

The one or more processors 1512, the memory 1516, the transceiver 1502, and the modem 1514 may operate in conjunction with the resource configuration component 155, the resource type determining component 1562, and/or the scheduling gap value determining component 1564 to enable one or more of the functions described herein in connection with a UE for resource configuring in a multi-hop IAB network.

Some Further Example Implementations

An example method of wireless communications by a network entity, comprising: determining a topological state of one or more of a parent node or a child node; determining a scheduling gap value for a set of resources, including a resource for the child node, based on the topological state of one or more of the parent node or the child node; and transmitting a configuration to the parent node for communicating with the child node based at least in part on the scheduling gap value.

The above example method, wherein the resource for the child node is indicated as a soft resource and the scheduling gap value represents a number of slots before the soft resource.

One or more of the above example methods, wherein the determining of the scheduling gap value is further based on a received message from the child node.

One or more of the above example methods, wherein the determining of the scheduling gap value is further based on one or more preconfigured rules.

One or more of the above example methods, wherein the topological state is one or more of a hop-level of the parent node or the child node, a depth of a subtree rooted at the parent node or the child node, a number of nodes within a chain of the parent node and the child node, or a resource pattern of one or more of the parent node or the child node.

One or more of the above example methods, wherein the determining the scheduling gap value is further based on one or more of a traffic demand within a network including the parent node and the child node, a resource utilization, capabilities of one or more of the parent node or the child node, or a type of communication between the parent node and the child node.

One or more of the above example methods, wherein each resource of the set of resources denotes a time-frequency location.

One or more of the above example methods, wherein each of the set of resources is indicated as one of a hard resource, a soft resource, or an unavailable resource.

One or more of the above example methods, wherein the scheduling gap value includes a first scheduling gap value, and further comprising: determining a second scheduling gap value for the set of resources, including a resource for a grandchild node, based on the topological state.

One or more of the above example methods, wherein the second scheduling gap value is less than or equal to the first scheduling gap value.

One or more of the above example methods, wherein the resource for the child node is an unavailable resource, the resource for the grandchild node is a soft resource, and the second scheduling gap value is greater than, less than, or equal to the first scheduling gap value.

One or more of the above example methods, further comprising: determining a third scheduling gap value for the set of resources, including a resource for a great-grandchild node, based on the topological state, wherein a resource for the great-grandchild node is a soft resource.

One or more of the above example methods, wherein the resource for the grandchild node is a soft resource and the third scheduling gap value is less than or equal to one or more of the first scheduling gap value or the second scheduling gap value.

One or more of the above example methods, wherein the resource for the grandchild node is an unavailable resource and the third scheduling gap value is greater than, less than, or equal to one or more of the first scheduling gap value or the second scheduling gap value.

One or more of the above example methods, wherein the scheduling gap value relates to a gap between at least one of a physical downlink control channel (PDCCH) and a physical downlink shared channel (PDSCH), or the PDCCH and a physical uplink shared channel (PUSCH).

One or more of the above example methods, wherein the scheduling gap value comprises a value of a slot offset.

An example method of wireless communications by a parent node, comprising: receiving a configuration for communicating with a child node based at least in part on a first scheduling gap value for a set of resources, including a resource for the child node, based on a topological state of one or more of the parent node or the child node, wherein the resource is indicated as a soft resource; determining a resource type of the resource for the child node; determining a second scheduling gap value for the set of resources based on one or more of the first scheduling gap value or the resource type of the resource for the child node; and transmitting the second scheduling gap value to the child node.

An example method of wireless communications by a child node, comprising: transmitting a topological state of the child node to one or more of a parent node or a central entity; and receiving a configuration for communicating with the parent node based at least in part on a scheduling gap value for a set of resources, including a resource for the child node, based on the topological state of the child node, wherein the resource is indicated as a soft resource.

The above example method, further comprising: requesting for an increase in value of the scheduling gap value in response to the receiving of the configuration based at least in part on the scheduling gap value.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method of wireless communications by a network entity, comprising:

determining, by the network entity, a topological state of one or more of a parent node of the network entity or a child node of the network entity, wherein the parent node schedules the network entity and the network entity schedules the child node;

determining, by the network entity, a scheduling gap value for a set of resources, including a resource for the child node, based on the topological state of one or more of the parent node or the child node, wherein the scheduling gap value is a number value representing a number of slots before the resource for the child node in which a control resource is to be transmitted to schedule data in the resource for the child node; and transmitting, by the network entity and to the parent node, a configuration for communicating with the child node, wherein the configuration indicates the scheduling gap value, wherein the determining of the scheduling gap value is further based on a received message from the child node, wherein the received message indicates a requested scheduling gap value, and wherein determining the scheduling gap value includes determining the scheduling gap value as the requested scheduling gap value.

2. The method of claim 1, wherein the resource for the child node is indicated as a soft resource and the scheduling gap value represents the number of slots before the soft resource.

3. The method of claim 1, wherein the determining of the scheduling gap value is further based on one or more preconfigured rules.

4. The method of claim 1, wherein the topological state is one or more of a hop-level of the parent node or the child node, a depth of a subtree rooted at the parent node or the child node, a number of nodes within a chain of the parent node and the child node, or a resource pattern of one or more of the parent node or the child node.

5. The method of claim 1, wherein the determining the scheduling gap value is further based on one or more of a traffic demand within a network including the parent node and the child node, a resource utilization, capabilities of one or more of the parent node or the child node, or a type of communication between the parent node and the child node.

6. The method of claim 1, wherein each resource of the set of resources denotes a time-frequency location.

7. The method of claim 1, wherein each of the set of resources is indicated as one of a hard resource, a soft resource, or an unavailable resource.

8. The method of claim 1, wherein the scheduling gap value includes a first scheduling gap value, and further comprising:

determining a second scheduling gap value for the set of resources, including a resource for a grandchild node, based on the topological state.

9. The method of claim 8, wherein the second scheduling gap value is less than or equal to the first scheduling gap value.

10. The method of claim 8, wherein the resource for the child node is an unavailable resource, the resource for the grandchild node is a soft resource, and the second scheduling gap value is greater than, less than, or equal to the first scheduling gap value.

11. The method of claim 8, further comprising:

determining a third scheduling gap value for the set of resources, including a resource for a great-grandchild node, based on the topological state, wherein a resource for the great-grandchild node is a soft resource.

12. The method of claim 11, wherein the resource for the grandchild node is a soft resource and the third scheduling gap value is less than or equal to one or more of the first scheduling gap value or the second scheduling gap value.

13. The method of claim 11, wherein the resource for the grandchild node is an unavailable resource and the third scheduling gap value is greater than, less than, or equal to one or more of the first scheduling gap value or the second scheduling gap value.

14. The method of claim 1, wherein the scheduling gap value relates to a gap between at least one of a physical downlink control channel (PDCCH) and a physical downlink shared channel (PDSCH), or the PDCCH and a physical uplink shared channel (PUSCH).

15. The method of claim 1, wherein the scheduling gap value comprises a value of a slot offset.

16. A method of wireless communications by a parent node, comprising:

receiving, by the parent node and from a network entity that the parent node schedules, a configuration for communicating with a child node of the network entity based at least in part on a first scheduling gap value for a set of resources, including a resource for the child node, based on a topological state of one or more of the parent node or the child node, wherein the resource is indicated as a soft resource, and wherein the first scheduling gap value is a number value representing a number of slots before the resource for the child node in which a control resource is to be transmitted to schedule data in the resource for the child node;

determining, by the parent node, a resource type of the resource for the child node;

determining, by the parent node, a second scheduling gap value for the set of resources based on one or more of the first scheduling gap value or the resource type of the resource for the child node; and transmitting, by the parent node and via the network entity, the second scheduling gap value to the child node.

17. A method of wireless communications by a child node, comprising:

transmitting, by the child node that is scheduled by a network entity, a topological state of the child node to one or more of a parent node that schedules the network entity or a central entity;

transmitting, by the child node, a message indicating a requested scheduling gap value; and receiving, by the child node, a configuration for communicating with the parent node based at least in part on a scheduling gap value for a set of resources, including a resource for the child node, based on the topological state of the child node, wherein the scheduling gap value is a number value representing a number of slots before the resource for the child node in which a control resource is to be transmitted to schedule data in the resource for the child node and wherein the resource is indicated as a soft resource, wherein the configuration indicates the scheduling gap value as the requested scheduling gap value.

18. The method of claim 17, further comprising:

requesting for an increase in value of the scheduling gap value in response to the receiving of the configuration based at least in part on the scheduling gap value.

19. A network entity for wireless communications, comprising:

a memory storing instructions; and a processor communicatively coupled with the memory and configured to execute the instructions to:

determine a topological state of one or more of a parent node of the network entity or a child node of the network entity, wherein the parent node schedules the network entity and the network entity schedules the child node;

determine a scheduling gap value for a set of resources based on a received message from the child node, including a resource for the child node, based on the topological state of one or more of the parent node or the child node, wherein the scheduling gap value is a number value representing a number of slots before the resource for the child node in which a control resource is to be transmitted to schedule data in the resource for the child node, wherein the received message indicates a requested scheduling gap value, and wherein the processor is configured to execute the instructions to determine the scheduling gap value as the requested scheduling gap value; and transmit a configuration to the parent node for communicating with the child node, wherein the configuration indicates the scheduling gap value.

20. The network entity of claim 19, wherein the resource for the child node is indicated as a soft resource and the scheduling gap value represents the number of slots before the soft resource.

21. The network entity of claim 19, wherein the processor is further configured to execute the instructions to:

determine the scheduling gap value for the set of resources further based on one or more preconfigured rules.

22. The network entity of claim 19, wherein the topological state is one or more of a hop-level of the parent node or the child node, a depth of a subtree rooted at the parent node or the child node, a number of nodes within a chain of the parent node and the child node, or a resource pattern of one or more of the parent node or the child node.

23. The network entity of claim 19, wherein the processor is further configured to execute the instructions to:

determine the scheduling gap value for the set of resources further based on one or more of a traffic demand within a network including the parent node and the child node, a resource utilization, capabilities of one or more of the parent node or the child node, or a type of communication between the parent node and the child node.

24. The network entity of claim 19, wherein each resource of the set of resources denotes a time-frequency location.

25. The network entity of claim 19, wherein each of the set of resources is indicated as one of a hard resource, a soft resource, or an unavailable resource.

26. The network entity of claim 19, wherein the scheduling gap value includes a first scheduling gap value, and wherein the processor is further configured to execute the instructions to:

determine a second scheduling gap value for the set of resources, including a resource for a grandchild node, based on the topological state.

27. A parent node for wireless communications, comprising:

a memory storing instructions; and a processor communicatively coupled with the memory and configured to execute the instructions to:

receive, from a network entity that the parent node schedules, a configuration for communicating with a child node of the network entity based at least in part on a first scheduling gap value for a set of resources, including a resource for the child node, based on a topological state of one or more of the parent node or the child node, wherein the first scheduling gap value is a number value representing a number of slots before the resource for the child node in which a control resource is to be transmitted to schedule data in the resource for the child node and wherein the resource is indicated as a soft resource;

determine a resource type of the resource for the child node;

determine a second scheduling gap value for the set of resources based on one or more of the first scheduling gap value or the resource type of the resource for the child node; and transmit, via the network entity, the second scheduling gap value to the child node.

28. A child node for wireless communications, comprising:

a memory storing instructions; and a processor communicatively coupled with the memory and configured to execute the instructions to:

transmit a topological state of the child node to one or more of a parent node that schedules a network entity or a central entity, wherein the child node is scheduled by the network entity;

transmit a message indicating a requested scheduling gap value; and receive a configuration for communicating with the parent node based at least in part on a scheduling gap value for a set of resources, including a resource for the child node, based on the topological state of the child node, wherein the scheduling gap value is a number value representing a number of slots before the resource for the child node in which a control resource is to be transmitted to schedule data in the resource for the child node and wherein the resource is indicated as a soft resource, wherein the configuration indicates the scheduling gap value as the requested scheduling gap value.

\* \* \* \* \*